United States Patent [19]

Tucchio

[11] Patent Number: 5,244,323
[45] Date of Patent: Sep. 14, 1993

[54] SELF LOCKING SET SCREW

[75] Inventor: Michael A. Tucchio, East Lyme, Conn.

[73] Assignee: The United States of America as represented by the Secretary of the Navy, Washington, D.C.

[21] Appl. No.: 12,837

[22] Filed: Feb. 3, 1993

[51] Int. Cl.5 .................... F16B 13/06; F16B 39/02
[52] U.S. Cl. ........................... 411/271; 411/54; 411/393
[58] Field of Search ....................... 411/49–51, 411/54, 271, 325, 393, 910, 222; 377

[56] References Cited

U.S. PATENT DOCUMENTS

| | | | |
|---|---|---|---|
| 1,438,648 | 12/1922 | Jacobs | 411/271 X |
| 2,159,580 | 5/1939 | Zifferer | 411/51 |
| 2,533,748 | 12/1950 | Weissert | 411/54 X |
| 2,900,863 | 8/1959 | Maynard | 411/271 |
| 3,479,072 | 11/1969 | Kosar | 411/54 X |
| 4,411,570 | 8/1983 | Juric | 411/271 |
| 4,589,693 | 5/1986 | Kennedy | 411/910 X |
| 4,711,760 | 12/1987 | Blaushild | 411/910 X |
| 4,976,577 | 12/1990 | Brown et al. | 411/271 |
| 5,098,239 | 3/1992 | Thiel | 411/377 |

Primary Examiner—Neill R. Wilson
Attorney, Agent, or Firm—Michael J. McGowan; Prithvi C. Lall; James M. Kasischke

[57] ABSTRACT

A threaded, locking set screw with standard outer dimensions having a threaded body, an expansion plug, and a retaining wedge. The threaded body has a tapered cavity at its bottom end. The expansion plug and retaining wedge are inserted into the cavity in the body. The base of the plug extends from the cavity, and the plug is held in place by a force fit between the wedge and a retaining slot in the body. When the set screw is tightened against a part, the plug is forced into the cavity. Because of a locking taper between the plug and the cavity, the plug exerts an outward force on the inner surface of the cavity causing the set screw body to expand radially, thus, locking the set screw in place.

6 Claims, 1 Drawing Sheet

SELF LOCKING SET SCREW

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to threaded fasteners and more specifically to a means for keeping threaded fasteners in position when subjected to vibration or shock and particularly to a set screw which may be tightened and loosened numerous times without destroying the set screw.

(2) Description of the Prior Art

It is well known that threaded fasteners loosen over time when the part to which the fastener is affixed is subjected to shock or vibration. This is particularly true of screw type fasteners used on devices with moving parts or in conjunction with motors or vehicles. To prevent this loosening, locking fasteners are available to hold a threaded fastener in place until it is purposefully loosened.

Set screws are especially prone to loosening because of vibration or shock. In many cases, a set screw is used to secure a collar to a D-shaped shaft by tightening the set screw in an aperture in the collar to apply pressure to the flat side of the shaft. The set screw is subjected to shock each time the shaft is started and vibration while the shaft is rotating. Unlike ordinary cap screws, set screws do not usually have a cap because a cap limits the distance the fastener can be tightened into an aperture and a protruding cap on a rotating part can damage equipment and personnel. Washers cannot be used in many of these applications because the use of washers requires the presence of a cap to retain the washer against the part.

Alternate methods are available for locking a set screw to a part to prevent the screw from loosening. These methods include staking the set screw to the part, and providing a substance in or with the set screw that binds the threads of the set screw to the threads of the part. Problems are apparent with each of the above solutions. Staking the set screw to the part requires prick punching the boundary between the set screw and the part. This method creates an unsightly surface on the part and, over multiple lockings, damages both the set screw and the part. Using a binding substance with the set screw can destroy the set screw and clog threads in the part. Furthermore, fasteners containing a binding substance cannot be reused.

Many types of prior art locking fasteners exist, but only a few of these fasteners are designed to lock when the end of the fastener contacts the end of a threaded aperture. For example, U.S. Pat. No. 2,900,863 discloses a two piece expansion bolt with a cylindrical shank and an expansion plug. When the shank of this fastener is driven into an aperture, the expansion plug acts to expand the lower end of the fastener against the walls of the aperture. Some disadvantages of this prior art invention are that the fastener is not easily removable from the aperture, the shank and expansion plug are two separate pieces, and the fastener is not designed for use in a threaded aperture.

Two other basic locking fastener designs are disclosed by U.S. Pat. Nos. 4,411,570 and 4,976,577. These patents disclose hollow, threaded, locking fasteners having a plunger inserted in the head of the fastener and driven into the fastener to expand the lower end of the fastener against the part. These inventions have the disadvantage that a special tool must be used to remove the fastener from the aperture. No provision is made for retaining the plunger in the fastener during insertion or storage. Furthermore, the head of the fastener must be near the surface of the part to allow the plunger to be driven into the fastener.

SUMMARY OF THE INVENTION

Accordingly, it is a general purpose and object of the present invention to provide a means for securing a set screw to prevent unintended loosening because of vibration or shock.

It is a further object that such means allow the set screw to be purposefully loosened when necessary.

Another object is that such set screw be reusable after removal from the part.

Still another object is that such set screw be provided in one piece to facilitate storage and installation.

These objects are accomplished with the present invention by providing a threaded set screw with standard outer dimensions which radially expands when the set screw is tightened against a part, allowing the set screw to remain tight despite vibration or shock. The device comprises a threaded body, an expansion plug, and a retaining wedge. The upper end of the device may have a Phillips, Allen or any other well known fastening type aperture therein. The lower end of the set screw is inserted into a threaded aperture in the part. The threaded body has a tapered cavity at the lower end of the set screw and a retaining slot extending across the diameter of the set screw. The plastic expansion plug is attached to the retaining wedge, and the plug and wedge are inserted together into the cavity by aligning the retaining wedge with the retaining slot and pressing the plug into the cavity with the wedge having a force fit with the slot. The base of the plug extends from the cavity in the set screw, and the plug is held in place by the force fit between the wedge and the slot.

When the set screw is tightened against a part, the plug is forced into the cavity by compression against whatever may lie at the end of the threaded aperture in the part. The plug exerts an outward force on the inner surface of the cavity causing the set screw to expand radially, thus, locking the set screw in place.

BRIEF DESCRIPTION OF THE DRAWINGS

A more complete understanding of the invention and many of the attendant advantages thereto will be readily appreciated as the invention becomes better understood by reference to the following detailed description when considered in conjunction with the accompanying drawings wherein.

DESCRIPTION OF THE PREFERRED EMBODIMENT

Figure 1:
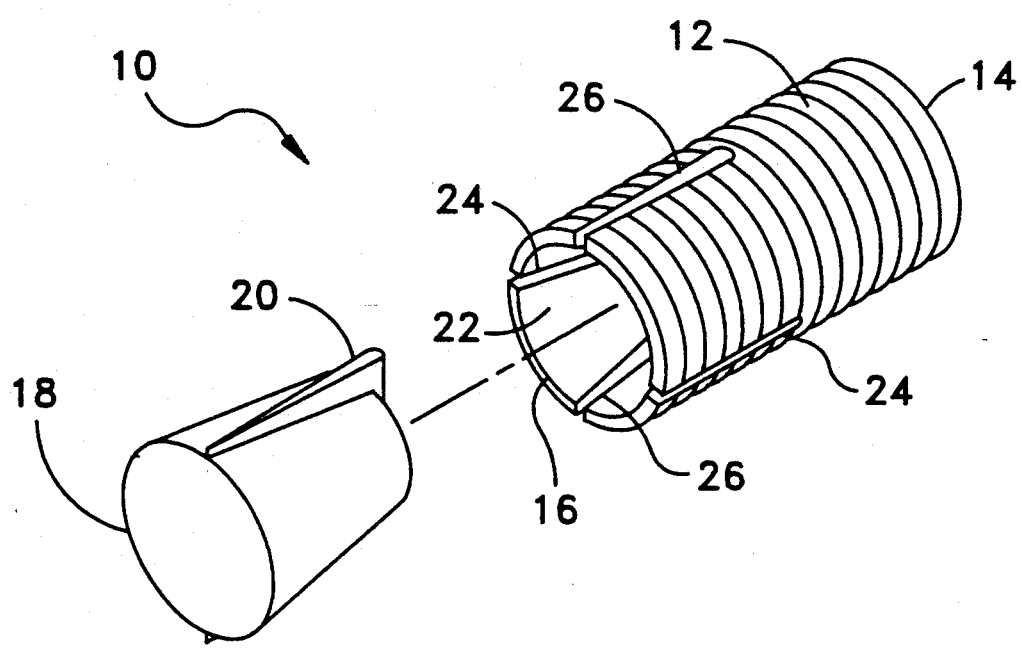
FIG. 1 shows an exploded perspective view of the self-locking set screw of the present invention.

Referring now to FIG. 1 there is shown a self-locking set screw 10 of the current invention. The set screw comprises a threaded, metal fastener body 12 having an upper end 14 and a lower end 16, and a plastic expansion plug 18 with a retaining wedge 20. Threaded fastener body 12 is cylindrical with a tapered cavity 22 opening at lower end 16 of body 12. Threaded fastener body 12 also has two expansion slots 24 and two retaining slots 26 at lower end 16 thereof. Expansion slots 24 and retaining slots 26 extend along the length of body 12 and pass through the wall of body 12 to cavity 22. Retaining slots 26 are tapered, narrowing from the closed end to lower end 16. The upper end of body 12 has an Allen, Phillips or other standard tightening aperture formed thereon to allow tightening.

Plastic expansion plug 18 is a tapered cylinder with a retaining wedge 20 formed integrally with plug 18. The taper of expansion plug 18 provides an approximately 10° locking taper between plug 18 and the wall of cavity 22. Plug 18 extends beyond cavity 22 when inserted. Retaining wedge 20 forms a rectangle about plug 18 and extends beyond the tapered, upper end of plug 18. Retaining Wedge 20 is relatively more thick at the upper portion thereof allowing a force fit when retaining wedge 20 is inserted in retaining slot 26. Wedge 20 has substantially the same width as the diameter of threaded body 20 so that wedge 20 will not protrude from threaded body 12 when plug 18 is inserted.

Expansion plug 18 is pressed into cavity 22 with retaining wedge 20 aligned with retaining slots 26. The force fit between retaining slots 26 and retaining wedge 20 holds plug 18 and body 12 together during storage and insertion.

Figure 2:
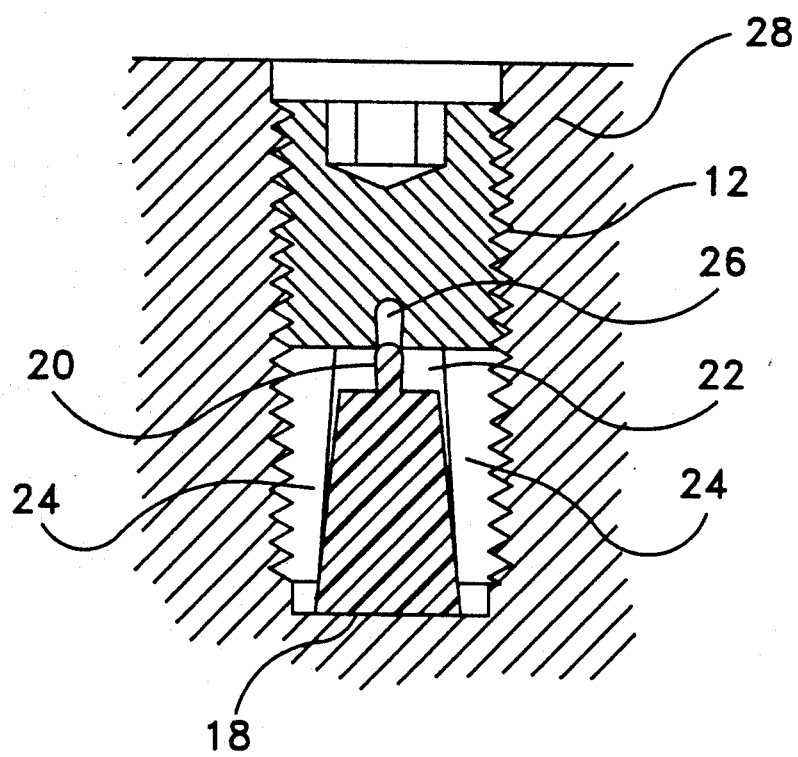
FIG. 2 shows a cut away view of the self-locking set screw as installed in a part.

Referring now to FIG. 2 there is shown a set-screw 10 of the current invention inserted into a part 28. To use the set screw assembly, set screw 10 is inserted into threaded aperture in part 28 and tightened. When the base of wedge 18 comes into contact with the end of the aperture, wedge 18 is forced into cavity 22 pushing outward on body 12 Expansion slots 24 and retaining slots 26 reduce the stiffness of body 12 allowing the sides of body 12 to expand radially against part 28 thereby increasing the friction between part 28 and body 12 and locking the set screw in place. Set screw 10 is thus held in place until it is purposefully loosened.

When set screw 10 is loosened, body 12 is unscrewed from part 28 leaving a gap below screw 10. This gap allows plug 18 to be pushed out of body 12 by the acton of sides of body 12 on tapered plug 18. Once plug 18 is pushed out of body 12 the sides of body 12 are forced into their original shape by the wall of aperture in part 28 thereby allowing set screw 10 to be removed.

The self-locking set screw of the present invention provides a threaded fastener without a cap that will not loosen over time because of vibration or shock. The set screw can be made in standard sizes and used with existing threaded apertures. Once inserted the locking wedge is retained with the set screw and will not be separated from the screw in storage. Using standard tools the set screw can be purposefully removed from the part and reused.

What has thus been described is a self-locking set screw having a lower portion which expands radially when the set screw is tightened against the part. The set screw is a standard size and can fit in any standard threaded aperture of that size.

Obviously many modifications and variations of the present invention may become apparent in light of the above teachings. For example: the set screw can be made with a cap if necessary; other materials can be used; the difference in taper between the plug and the cavity can be any taper that allows the use of axial force to expand the body radially; the plug can be retained by multiple wedge portions engaging multiple slots rather than two as in the current embodiment; the set screw can have any number of expansion slots around the base thereof; and the top of the screw can have any of several types of fastening recesses.

In light of the above, it is therefore understood that within the scope of the appended claims, the invention may be practiced otherwise than as specifically described.

What is claimed is:

1. A self locking set screw comprising:
a cylindrical, externally threaded body with top and bottom ends having a cavity therein at said bottom end thereof, said cavity having a truncated cone shape taper with the wide end of said cavity being at said bottom end of said body, and said body having at least two expansion slots therein to allow radial expansion of said body at said bottom end thereof, said expansion slots being parallel to the axis of said body; and
an expansion plug made from an elastomeric material inserted in said body cavity, said expansion plug having a truncated cone shape with a larger base portion and a smaller top portion, said plug being tapered less than said body cavity taper to have a forcing taper fit between said plug and said body cavity, said base portion of said plug extending beyond said body cavity to cause said body to expand radially when axial pressure is exerted on said base portion of said plug by tightening said threaded body, thereby forcing said plug into said body cavity.

2. The device of claim 1 further comprising a retaining means interposed between said expansion plug and said cylindrical threaded body for retaining said expansion plug in said cavity in said cylindrical threaded body.

3. The device of claim 2 wherein said retaining means further comprises:
said body having one or more retaining slots therein at said bottom end thereof, said retaining slots being parallel to the axis of said body, said retaining slots extending through a complete diameter of said body wherein said retaining slots are in communication with said body cavity, and said retaining slots being tapered with the narrow end of said retaining slots being at said bottom end of said body; and
a retaining wedge fixedly attached to said plug, said wedge varying in thickness with the thickest portion of said wedge being near the top thereof, and the thinnest portion of said wedge being at the bottom thereof, said wedge being rectangular in shape in combination with said plug, said wedge engaging said body with a force fit at said retaining slot to retain said plug in said body when said wedge and plug combination is inserted in said body, said wedge being wider than said base of said plug and having substantially the same width as the outer diameter of said body, said wedge being oriented vertically in relation to said plug with the top of said wedge being near the top of said plug and the bottom of said wedge being near the bottom of said plug, and said wedge being coplanar with the axis of said plug.

4. The device of claim 3 further comprising a tightening aperture disposed on said top end of said body.

5. The device of claim 4 wherein said retaining wedge is manufactured with a rounded top edge to aid in inserting said wedge into said retaining slot.

6. The device of claim 5 wherein said retaining wedge is integrally formed with said expansion plug.

* * * * *